March 15, 1955 A. E. WATSON 2,704,122
METHOD AND APPARATUS FOR CUTTING TREADS OF TIRE CASINGS
Filed Aug. 30, 1952 3 Sheets-Sheet 3

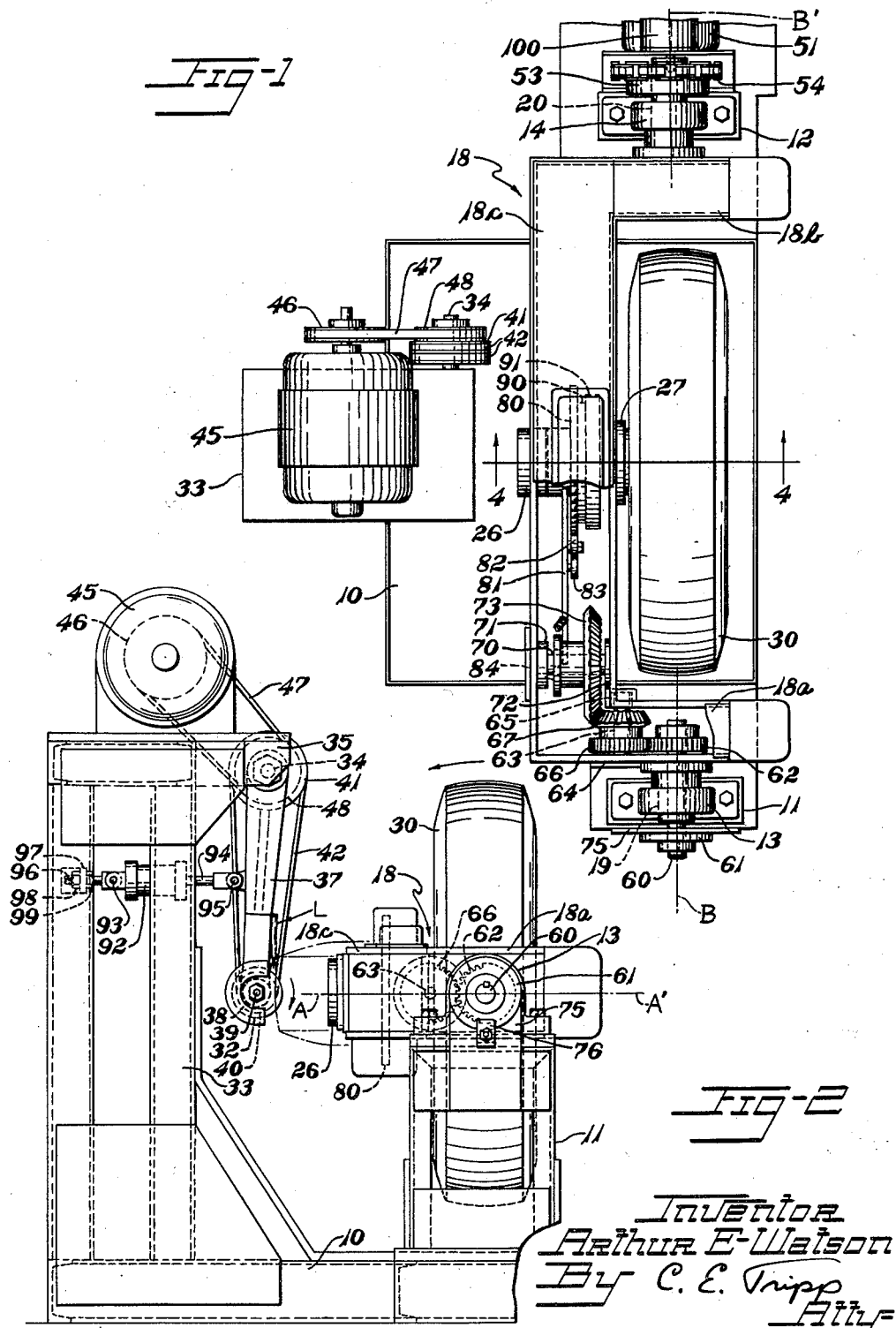

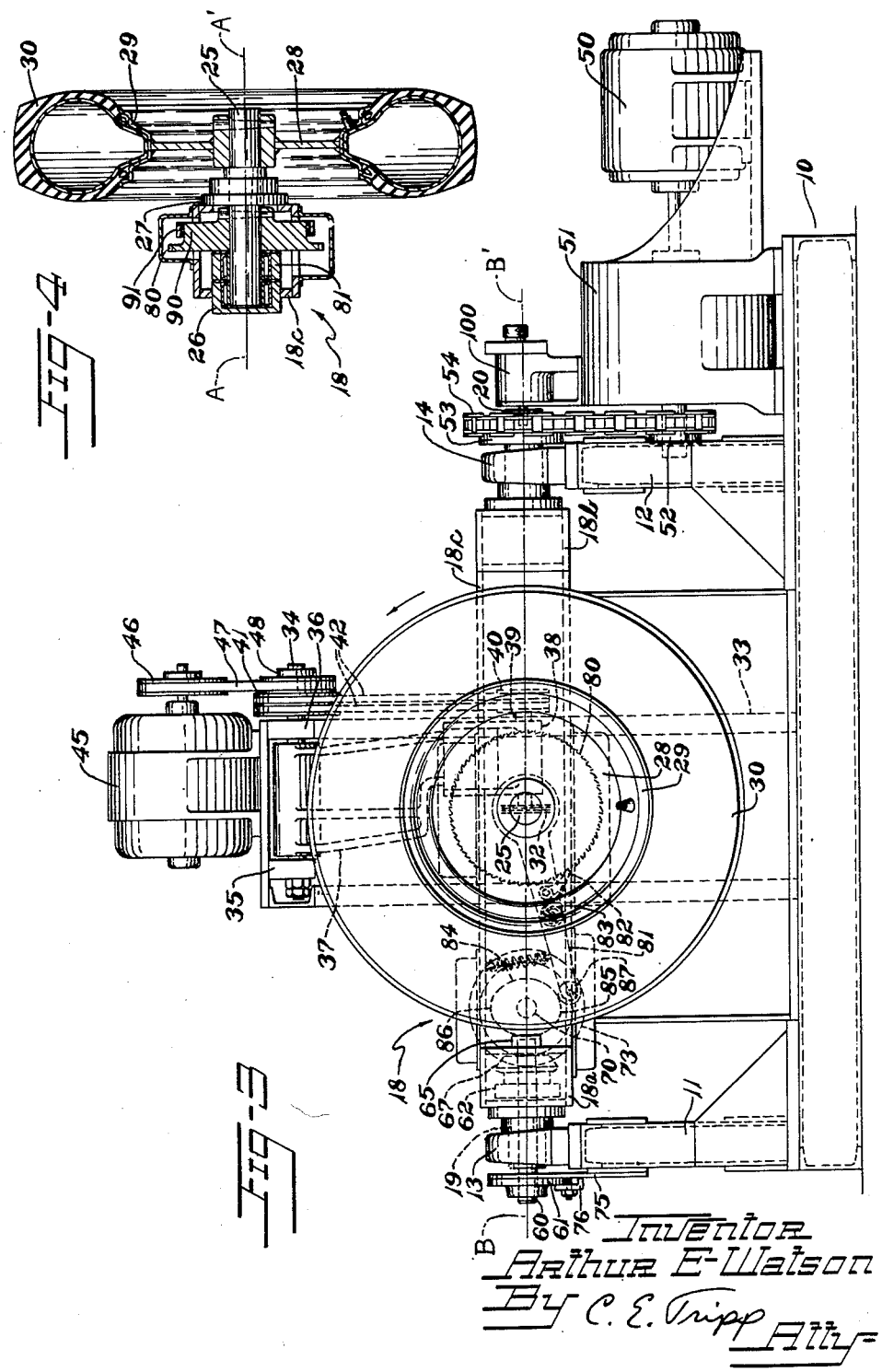

Inventor
Arthur E. Watson
By C. E. Tripp
Atty.

United States Patent Office

2,704,122
Patented Mar. 15, 1955

2,704,122

METHOD AND APPARATUS FOR CUTTING TREADS OF TIRE CASINGS

Arthur E. Watson, Akron, Ohio, assignor to The B. F. Goodrich Company, New York, N. Y., a corporation of New York Application August 30, 1952, Serial No. 307,269

14 Claims. (Cl. 164—10.2)

This invention relates to the cutting or slitting of the peripheral portion of toroidal members and more specifically to such cutting of laterally extending slits in the treads of tire casings to provide increased traction on wet or slippery road surfaces.

As an example of how the invention may be practiced embodiments thereof will be described in connection with the slitting of tire treads. It has been found that transverse slitting of tire treads increases traction, particularly on slippery or wet roads. However, in the past slit tires have proven to be noisy in operation but it has been found that if the slits are very closely spaced not only is the noise greatly reduced but the life and wearing qualities of the tire are increased. For example, a slit spacing of $\frac{1}{16}''$ will cause the road noise to be supersonic and hence inaudible, but great difficulty has been encountered in cutting slits this close in production, because of several inter-related problems. With a slit spacing of this order it becomes necessary to provide more accurate and uniform spacing than is provided by prior machines. For example, errors of slit spacing become relatively great in proportion to the width of tread material between successive slits and these errors become apparent to the eye, marring the appearance of the tire as well as rendering the action of the slit tire on the road non-uniform. Also, when the slits are closely spaced variations in slit depth from slit to slit have an increased effect upon the flexing action of the individual tread blocks between the slits, so that it is quite important that all slits be identical as to depth of cut.

The problems of performing the actual cutting operations are also aggravated with slit spacings of the order mentioned. For example, in high production machines rotating cutters are employed and these must be lubricated, usually with water. It has been found that best results are obtained when the peripheral direction of motion of the tire relative to the axis of knife rotation is the same as that of the rotating knife portions that are cutting the tire. With this arrangement, which will henceforth be called a "climbing cut," there is no tendency for the cutters to stretch the rubber blocks during the cutting operation, with the result that the slitting is inherently more uniform. Also the lubricant may be introduced at the leading edge of the cutter which causes the cutter to carry the water into the cutting zone. If the relative motions just described are reversed, all these advantages are lost. The lifting action of the cutter temporarily displaces the rubber, resulting in irregular operation and occasional wedge shaped or nonstandard blocks and the blocks may even be torn or mutilated. The efficiency of the lubricant is reduced because now the cutters tend to carry the lubricant away from the cutting zone.

Finally, it will be apparent that a simple and rugged knife mounting is to be desired because looseness or wear at this part of the machine will have a detrimental effect on uniformity of the slit spacing.

Accordingly, it is a principal object of the present invention to provide precise spacing of the slits, to maintain precisely the depth of the cuts about the periphery of a tire tread, and to prevent mutilation and tearing of the blocks formed by the slits.

Briefly this is accomplished by mounting the tire for rotation about its own axis on trunnions so disposed that during cutting they revolve the tire unidirectionally about a great diameter thereof to bring alternate opposed faces of the tire tread against rotating knives that are rotating so as to perform a climbing cut. The tire is suitably indexed between or during cuts by precisely controlled rotation of the tire about its own axis. Since the tire rotation is unidirectional all cuts will be climbing cuts. Also, since cutting takes place due to motion of the tire over the knives and not vice versa, most of the motion and hence wear and play of the parts, occurs at the rotary joints of the tire mounting apparatus instead of at both the tire mounting apparatus and the knife moving apparatus as in prior machines. Since rotary joints are readily maintained in precise adjustment the aforesaid objects and advantages of this invention are attainable on a production basis.

In the past it has been customary to use rotary gang cutters so that a plurality of slits are produced at each pass. This was done because of the inherent slowness of prior machines but with closely slit tires of the type described gang cutters have several disadvantages. First, since the cutters must be closely spaced, there is a tendency for the rubber between the cutters to become crowded and possibly torn. Next, blocks formed by cuts of the outside cutters might not be identical with the others. The latter condition is aggravated by the indexing problem. Since gang cutters must be indexed between cuts, the very presence of this intermittent operation introduces causes of error due to wear of parts, or to theoretically incorrect adjustment for a given size tire. Indexing errors tend to negate the very advantage sought by close slits, namely quiet operation. Although the slit blocks themselves may produce supersonic noise, regularly recurring variations of slit spacing may produce audible noise.

Accordingly, an object of a modified form of the invention resides in the elimination of the intermittent indexing operation. This is accomplished by using a single knife or small gang of knives that cut the slits while the tire is constantly rotated about its own axis as well as simultaneously rotated about an axis corresponding to a diameter of the tire as has been described. This results in spiral slits, but the deviation is small particularly where one or two knives are employed. This operation is practical because of the high speed operation inherent in the machine.

These and other objects will appear from the following description and the accompanying drawings showing embodiments of the invention.

In the drawings,

Fig. 1 is a plan view of an apparatus constructed in accordance with and embodying the invention.

Fig. 2 is an end elevation thereof.

Fig. 3 is a side elevation thereof.

Fig. 4 is a detail sectional view taken on line 4—4 of Fig. 1.

Figure 5:
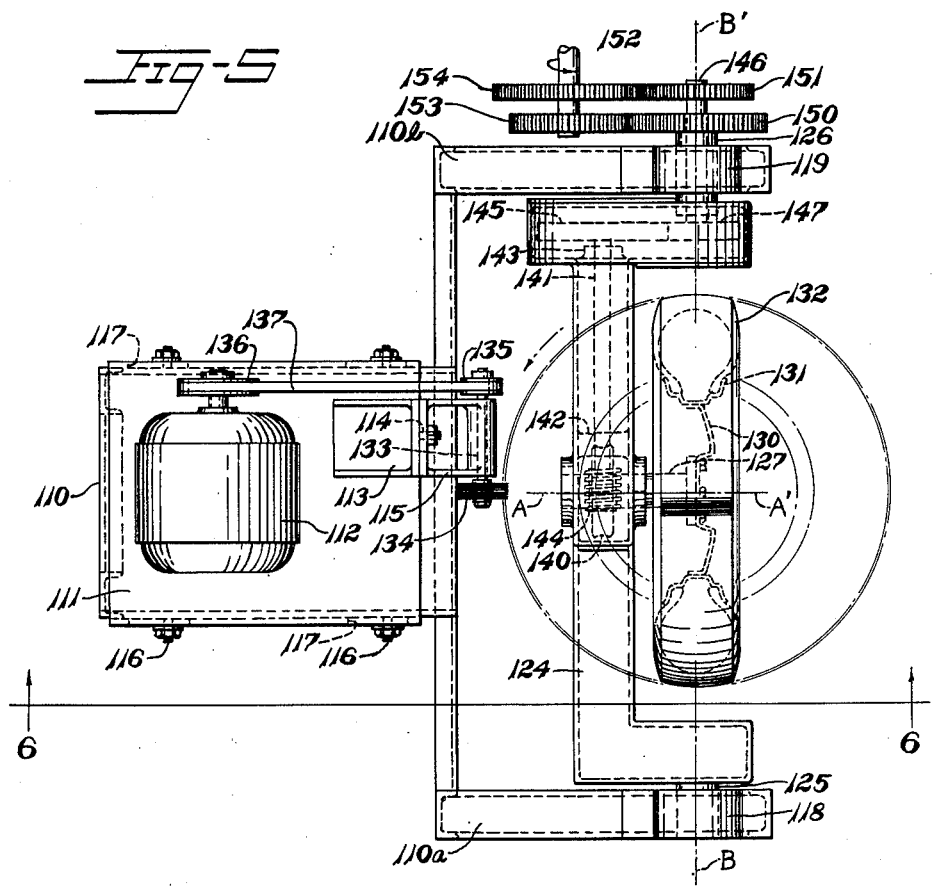
Fig. 5 is a plan view of a modified apparatus constructed in accordance with and embodying the invention showing in full lines a tire casing mounted thereon with its axis in the plane of the drawing and in dot and dash lines the position of the casing when its axis is normal to the plane of the drawing.

As has been briefly described according to applicant's invention, a tire casing is mounted upon a supporting wheel and is rotated about its own axis for indexing while at the same time the tire is rotated about a second axis perpendicular to and intersecting the first axis and lying in the medial plane of the tire for cutting. As seen in Figs. 1–4 the apparatus for so mounting the tire includes a stationary base plate 10 and a pair of spaced pedestals 11, 12 fixed thereto which have pillow blocks 13, 14 mounted thereon at their upper extremities in alignment with each other. A moveable frame 18 has trunnions 19, 20 fixed thereto and mounted for rotation in the pillow blocks 13, 14 respectively. The frame 18 is of hollow rectangular cross section and is like a single throw crank shaft having check portions 18a, 18b at the trunnions 19, 20 respectively and a throw portion 18c connecting them and offset from the axis of rotation B—B' of the trunnions to permit mounting of the tire as hereinafter described.

Midway between portions 18a, 18b of the movable frame 18 a shaft 25 is mounted for free rotation in bearings 26, 27 secured to the throw portion 18c of the movable frame 18 with its axis A—A' perpendicular to and intersecting axis B—B'. A wheel 28 is fixed to shaft 25 and has a channel rim 29 for mounting a tire casing 30, the central plane of the tire being coincident with axis B—B'. The arrangement is such that the tire may be rotated about its own axis A—A' and by rotating the movable frame 18 about its axis B—B' the tire casing may also be rotated about a great diameter of the casing.

A cutter 32 is mounted in the path of rotation of the tire about axis B—B'. For supporting and adjusting the cutter, a pedestal 33 is fixed to base plate 10, a horizontal shaft 34 having its axis parallel to axis B—B' is supported in brackets 35, 36 from the upper extremity of pedestal 33. A swing frame 37 is suspended from shaft 34 and has a bearing 38 at its lower end for rotatably supporting a spindle 39. The cutter 32 is removably secured to spindle 39 which also has a V-grooved pulley 40 secured thereto. Mounted on shaft 34 is a V-grooved pulley 41 and belts 42 drive pulley 40, and thereby cutter 32, from pulley 41. An electric motor 45 is mounted on pedestal 33 and has a V-grooved pulley 46 which through a belt 47 drives a V-grooved pulley 48 secured to pulley 41.

For rotating the movable frame and consequently rotating the tire casing about axis B—B', an electric motor 50 and a speed reducer 51 (see Fig. 3) are mounted on base plate 10. The arrangement is such that the motor drives the speed reducer and in turn a sprocket 52 thereon. A sprocket 53 is mounted in alignment with sprocket 52 on trunnion 20 to which it is secured and is driven from sprocket 52 by a drive chain 54. It will be noted that the cutter rotates in the same direction as does the tire about axis B—B' so that the teeth doing the cutting move with, but faster than, the tire. This produces what has been referred to as a "climbing cut" the advantages of which were explained.

For rotating the tire casing about its axis A—A', trunnion 19 is made tubular and a shaft 60 extends therethrough concentric therewith. The outer end of shaft 60 has a flange disc 61 secured thereto while the inner end has a gear 62 fixed thereto within the frame portion 18a. A counter shaft 63 is mounted in bearings 64, 65 secured to frame portion 18a, the shaft being parallel to shaft 60. Fixed to shaft 63 is a spur gear 66 equal in size to gear 62 and meshing therewith. A bevel pinion 67 is also fixed to shaft 63. A shaft 70 is mounted for rotation in bearings 71, 72 secured to throw portion 18c of the movable frame, the shaft 70 having its axis perpendicular to the axis of shaft 63. A bevel gear 73 is fixed to shaft 70 and meshes with bevel pinion 67 the gear being twice the size of the pinion and the ratio being 2 to 1 between shafts 60 and 70.

Flange 61 is adjustably secured to a stationary plate 75 on pedestal 11, as by a clamp 76. The arrangement is such that with flange 61 clamped, at each rotation of movable frame 18 about axis B—B', shaft 70 will be rotated one-half revolution.

The tire casing is rotated about its axis A—A' step by step and for this purpose a ratchet wheel 80 is fixed to shaft 25 which supports the tire. A ratchet lever 81 is pivotally mounted on shaft 25 and carries a pawl 82 which is pressed into engagement with the ratchet wheel by a spring 83 secured to lever 81. A cam 84 is fixed to shaft 70 and has two equal and opposite lobes 85, 86 which engage a roller 87 on lever 81. The arrangement is such that ratchet wheel 80, and the tire casing, is advanced once at each revolution of movable frame 18.

To prevent overrunning of ratchet wheel 80 due to inertia a brake drum 90 is secured to shaft 25 and a band brake 91 is secured to frame 18 and is adjusted to drag constantly on the drum.

Means are provided for adjusting the position of the cutter 32 and for withdrawing it from the path of the tire at the end of the cutting operation. For this purpose an air-operated cylinder 92 is pivotally mounted, as at 93 on pedestal 33, and its piston rod 94 is pivotally secured to swing frame 37, as at 95. In the most retracted position of the piston rod, the cutter 32 clears the tire and in its most advanced position is positioned to cut the tire to the desired depth. An adjusting screw 96 secured to pivot 93 passes through a clearance opening in an ear 97 on pedestal 33 and may be adjusted by nuts 98, 99 threaded thereon at opposite faces of the ear to set the cutter toward and from the tire casing.

For stopping the cutting operation when the desired number of cuts have been made, a revolution counter 100 is mounted on pedestal 12 and has its drive shaft secured to trunnion 20. The counter includes a switch (not shown) which opens an electric circuit after a given number of revolutions for which the counter may be set. For example, for a given slit spacing and knife assembly, the counter is set so that the switch is actuated after the tire has made substantially ½ turn about its own axis relative to the first cut. The switch is electrically in the motor control circuit of motor 50 and also in the electrical circuit of a solenoid operated valve controlling the supply of air to cylinder 92. Opening of the switch stops motor 50 and withdraws cutter 32 simultaneously.

Ratchet wheel 80 can be changed to accommodate various tire sizes and knife assemblies. Cam 84 is also made removable so that cams of different amounts of throw may be supplied for different ratchet wheels. The cutter 32 may be a single disc knife or may be a series of axially spaced discs for multiple cutting. In the latter case a cam and ratchet assembly is employed which will index the tire casing by an amount equal to the width of the multiple cutter plus the desired space equal to the spacing of the discs.

In order to insure that indexing will not occur during cutting, clamp 76 is released permitting frame 18 to be rotated on its trunnions until one slit has been cut across the face of the tire tread, then cam 84 may be set so as to start indexing at the position where the tire leaves the cutter. This may be done by rotating disc 61 and then tightening clamp 76. Counter 100 is then set to stop the operation at the end of the desired number of cuts.

The operation of the apparatus is as follows: The tire casing is mounted upon the rim 29 and inflated. The cutter 32 is adjusted to clear the tread of the tire casing in its retracted position and to be advanced to cut the tread to the desired depth. Motor 45 is started by a manually controlled switch (not shown), which also controls the solenoid for the cutter so as to advance the cutter. Motor 50 is started by a time delay switch and cutting begins. At each one-half revolution of frame 18, the tire tread passes the cutter 32 and one or more lateral slits are cut across the tread of the tire casing, the slits conforming to the radius of the tread surface about axis B—B'. Indexing is accomplished automatically at each one-half revolution of the tire about a diameter thereof corresponding to axis B—B'. At the completion of the desired number of cuts, the tire will have revolved one-half revolution about its own axis and the machine is stopped automatically by the revolution counter 100 and associated controls.

Figure 6:
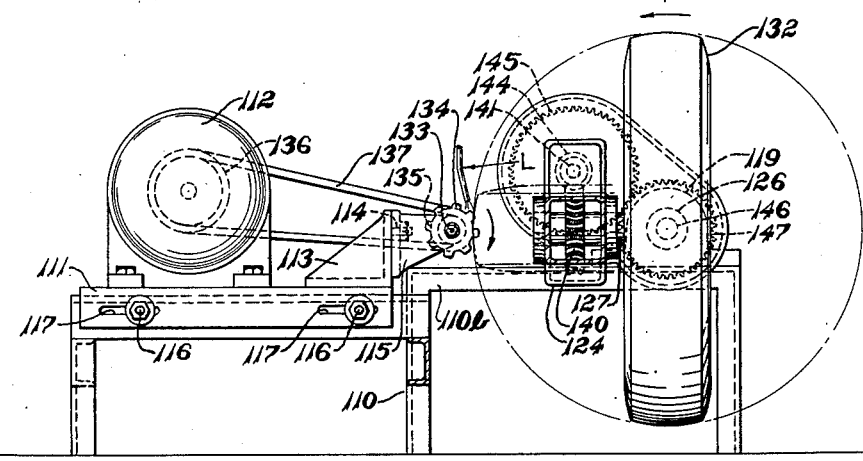
Fig. 6 is a sectional elevation of the apparatus of Fig. 5, taken on line 6—6 thereof.

Figs. 5 and 6 show a modified form of apparatus in which no indexing is required because the tire casing is rotated continuously about its axis A—A' while simultaneously being rotated about axis B—B' in order to cause slitting of the tread. In the form of the invention, a frame 110 supports a carriage 111, slideably mounted thereon. An electric motor 112 and an angle plate 113 are secured to the carriages. Angle plate 113 has a stud 114 projecting therefrom. A spindle support 115 is secured to the vertical face of angle plate 113 and is pivotally adjustable about stud 114. It may be clamped to the angle plate by studs 114 passing through arcuate slots. Clamp bolts 116 are secured to frame 110 and pass through slots 117 in carriage 111 to secure it in position.

Frame 110 has spaced wing portions 110a, 110b extending therefrom on which are bearings 118, 119. A single throw crank-like movable frame 124, of hollow rectangular cross section has trunnions 125, 126 which seat in bearings 118, 119 respectively and permit frame 124 to rotate about an axis B—B'. A wheel 130 having a channel rim 131 is secured to shaft 127 for mounting a tire casing 132 with a great diameter of the tire coincident with axis B—B'. A cutter spindle 133 is rotatably mounted in spindle support 115 and has a cutter 134 secured thereto in alignment with axis A—A'. The spindle also has a pulley 135 secured thereto for driving it from motor 112, a pulley 136 mounted on the motor shaft and a belt 137 being provided for this purpose.

For rotating the tire casing about axis A—A', a worm gear 140 is fixed to shaft 127. A shaft 141 is rotatably mounted in bearings 142, 143 within hollow frame 124.

A worm 144 is fixed to one end of shaft 141 and engages worm gear 140 and a spur gear 145 is fixed to its opposite end. Trunnion 126 is tubular and a shaft 146 rotatably extends therethrough. A spur gear 147 is secured to shaft 146 within hollow frame 124 and meshes with gear 145 on shaft 141. Trunnion 126 has a spur gear 150 secured to its outer end. Shaft 146 has a smaller spur gear 151 secured to its outer end. A drive shaft 152 driven by a suitable source of power (not shown) has gears 153, 154 secured thereto meshing with gears 150, 151 respectively. Gear 153 drives gear 150 and frame 124 about axis B—B' and gear 154 simultaneously rotates the tire casing about its own axis of rotation. Gears 150, 151, 153, 154 are change gears and drive frame 124 and the tire casing at differential velocities. As the tire casing is rotated continuously, the cuts across the tread of the tire will be inclined to the central plane of the tire by an amount depending upon the desired spacing of the cuts. With close spacing, this angularity will be slight and the tire will perform substantially like a tire having cross slits perpendicular to its plane of rotation.

To provide clearance for the cutter the spindle 133 may be inclined to correspond with the direction of the slits by adjusting spindle supports 115 on angle plate 113. A single disc cutter is preferred as the inclination of the slits is less than required with a gang cutter having a plurality of spaced cutting discs although a gang cutter may be employed where greater angularity of slits is desired, in which case the cutting operation is proportionately faster. Lubricant, such as water, is introduced by a pipe L in this and in the previously described form of the invention.

With either form of apparatus the tire is rotated about its own axis and is simultaneously rotated about a great diameter of the tire which shifts as the cutting proceeds, one or more cuts, depending upon the type of cutter employed, being made across the tread face of the tire each time the tread face passes the cutting position. Cuts are made alternately at opposite positions on the tire and the cutting is completed when the tire has rotated 180 degrees about its own axis. As mentioned, this construction eliminates the need for indexing the tire (and the knives) thereby providing the advantages initially described. In addition, in both embodiments of the invention, the tire acts as a flywheel giving smooth uniform operation. Rotation of the tire about its own axis is so slow relative to rotation about the trunnions that no appreciable gyroscopic effect is produced.

Variations may be made without departing from the scope of the invention as it is defined by the following claims.

I claim:

1. The method of cutting laterally extending slits across the tread of a tire comprising the steps of rotating the tire unidirectionally about a great diameter thereof, positioning a cutter in the path of the tread while rotating to slit the tread of the tire laterally as the tire rotates past the cutter, and rotating the tire about its own axis to space the cuts peripherally along the tire tread.

2. The method of cutting laterally extending slits across the tread of a tire comprising the steps of rotating the tire unidirectionally about a great diameter thereof, positioning cutters in the path of the tread while the tread is rotating, passing the cutters downwardly through the tread material and laterally therethrough in the direction of lateral motion of the material but at a relatively higher linear speed than that of the material being cut to slit the tread of the tire laterally as the tire rotates past the cutters, and rotating the tire about its own axis to space the cuts peripherally along the tire tread.

3. The method of cutting laterally extending slits across the tread of a tire comprising the steps of rotating the tire unidirectionally about a great diameter thereof, positioning a cutter in the path of the tread while rotating to slit the tread of the tire laterally as the tire rotates past the cutter, and rotating the tire about its own axis between successive cuts to space the cuts peripherally along the tire tread.

4. The method of cutting laterally extending slits across the tread face of a tire comprising the steps of rotating the tire unidirectionally about a diametric axis intersecting the midplane of the tire, maintaining a cutter in the path of the tire during its rotation and about said axis to cut slits alternately at opposite positions of the tread, and advancing the tire about its own axis of rotation between successive cuts to space the slits about the tread of the tire.

5. The method of cutting laterally extending slits across the tread face of a tire comprising the steps of rotating the tire unidirectionally about a diametric axis intersecting the midplane of the tire, maintaining a cutter in the path of the tire during its rotation and about said axis to cut slits alternately at opposite positions of the tread, and simultaneously continuously rotating the tire about its own axis of rotation to space the slits about the tread of the tire.

6. Apparatus for slitting the tread of a generally toroidal rubber tire comprising means for supporting the member for rotation about its axis, a pair of trunnions on said support means disposed on an axis intersecting said axis of said member in the midplane of the member, means for rotating said member and support means unidirectionally about said trunnions, a cutter disposed in the path of said member for cutting the latter during rotation on said trunnions, and means for rotating the supported member about its axis to space the slits peripherally about the member, that portion of said member supporting means that moves in a plane through said cutter and normal to the axis of said trunnions being closer to said trunnion axis than is the periphery of said cutter.

7. Apparatus for slitting the tread of a generally toroidal rubber tire comprising means for supporting the member for rotation about its axis, a pair of trunnions on said support means disposed on an axis intersecting said axis of said member in the midplane of the member, means for rotating said member and support means unidirectionally about said trunnions, a rotating cutter disposed in the path of said member for cutting the latter during rotation on said trunnions, means for rotating said cutter in a direction opposite to rotation of said member on its trunnions, and means for rotating said member about its axis to space the cuts peripherally about the member.

8. Apparatus for cutting laterally extending slits in the tread of a tire across the tread face thereof, said apparatus comprising means for supporting and rotating the tire unidirectionally about a great diameter thereof, a cutter located in the path of the tread portion of the tire during such rotation of the tire, and means for rotating the tire about its own axis while it is rotated about its great diameter, said last-named means comprising ratchet means for indexing the tire step by step between cuts, that portion of said member supporting means that moves in a plane through said cutter and normal to the axis of said trunnions being closer to said trunnion axis than is the periphery of said cutter.

9. Apparatus for cutting laterally extending slits in the tread of a tire across the tread face thereof, said apparatus comprising means for supporting and rotating the tire about a great diameter thereof, a cutter located in the path of the tread portion of the tire during such rotation of the tire, and gearing for continuously rotating the tire unidirectionally about its own axis while it is rotated about its great diameter, said gearing being timed relative to the speed of rotation of the tire about its great diameter to produce an array of relatively closely spaced spiral slits about the periphery of the tire.

10. Apparatus for cutting laterally extending slits in the tread of a tire across the tread face thereof, said apparatus comprising means for supporting and rotating the tire about a great diameter thereof, a rotatable cutter, means for rotating said cutter, means for moving said cutter into and out of the path of said tire, means for advancing the tire peripherally and unidirectionally about its own axis while it is so supported, means for sensing the number of cuts made in the tire, and control means actuated by said sensing means for stopping rotation of the tire about its great diameter and withdrawing said cutter from the path of the tire when the tire has rotated substantially one-half revolution about its own axis.

11. Apparatus for slitting the periphery of a tire comprising a base frame, a support rotatably mounted on said frame, tire mounting means on said support for supporting a tire for rotation about its axis, the axis of rotation of said support in said frame intersecting the axis of said tire mounting means substantially in the midplane of a mounted tire, means for rotating said support in the frame, a cutter disposed in the path of a tire mounted on said support for slitting the tire during rotation of said support in the frame, and means for rotating tire mounting means relative to said support to peripherally space the slits, said last named means comprising a sun gear fixed to the frame at the axis of rotation of said support in the frame, a rotatable planet gear mounted in said support and meshed with said sun gear, and ratchet means driven by said planet gear and connected to said tire mounting means for indexing the latter as said support is rotated in the frame.

12. Apparatus for slitting the periphery of a tire comprising a base frame, a support rotatably mounted on said frame, tire mounting means on said support for supporting a tire for rotation about its axis, the axis of rotation of said support in said frame intersecting the axis of said tire mounting means substantially in the midplane of a mounted tire, means for rotating said support in the frame, a cutter disposed in the path of a tire mounted on said support for slitting the tire during rotation of said support in the frame, and means for rotating tire mounting means relative to said support to peripherally space the slits, said last named means comprising a sun gear fixed to the frame at the axis of rotation of said support in the frame, a rotatable planet gear mounted in said support and meshed with said sun gear, a cam driven by said planet gear, a pawl engaging said cam, and a ratchet wheel moved by said pawl and connected to said tire mounting means for indexing the latter as said support is rotated in the frame.

13. A tire slitting machine comprising a frame, a C-shaped tire support having aligned trunnions on the opposed arms of the support journaled in said frame, mounting means extending from the connecting arm of said support for rotatably supporting a tire, a cutter on said frame for slitting a tire as said support rotates, drive means for rotating said support, and means for rotating said tire mounting means unidirectionally during rotation of said support for spacing the slits formed by said cutter.

14. Apparatus for cutting laterally extending slits across the tread of a tire comprising a flanged tire mounting rim, means for supporting and rotating the rim and a tire mounted on said rim about a great diameter of the tire, a cutter located in the path of the tread portion of the tire during such rotation of the rim and tire, and means for advancing the tire tread peripherally and unidirectionally about its own axis while it is so supported and rotated.

References Cited in the file of this patent

UNITED STATES PATENTS

| | | |
|---|---|---|
| 395,211 | Breul | Dec. 25, 1888 |
| 2,158,167 | Wickle | May 16, 1939 |
| 2,286,709 | Barcus | June 16, 1942 |
| 2,294,047 | Pollock | Aug. 25, 1942 |
| 2,303,813 | Barcus | Dec. 1, 1942 |
| 2,366,685 | Chambers | Jan. 2, 1945 |
| 2,392,667 | Hawkinson | Jan. 8, 1946 |

FOREIGN PATENTS

| | | |
|---|---|---|
| 90,759 | Sweden | Nov. 9, 1937 |